United States Patent
Baggen et al.

(10) Patent No.: US 9,768,867 B2
(45) Date of Patent: Sep. 19, 2017

(54) RECOVERING TIMING FROM A SELF-CLOCKING CODED LIGHT SIGNAL

(71) Applicant: PHILIPS LIGHTING HOLDING B.V., Eindhoven (NL)

(72) Inventors: Constant Paul Marie Jozef Baggen, Blerick (NL); Paul Henricus Johannes Maria Van Voorthuisen, Sint Oedenrode (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/785,447

(22) PCT Filed: Apr. 17, 2014

(86) PCT No.: PCT/EP2014/057852
§ 371 (c)(1),
(2) Date: Oct. 19, 2015

(87) PCT Pub. No.: WO2014/170419
PCT Pub. Date: Oct. 23, 2014

(65) Prior Publication Data
US 2016/0087720 A1    Mar. 24, 2016

(30) Foreign Application Priority Data
Apr. 19, 2013 (EP) .................................... 13164495

(51) Int. Cl.
*H04B 10/116* (2013.01)
*H04L 25/49* (2006.01)
(Continued)

(52) U.S. Cl.
CPC .......... *H04B 10/116* (2013.01); *H04L 7/0066* (2013.01); *H04L 7/0331* (2013.01);
(Continued)

(58) Field of Classification Search
USPC ......................................................... 398/119
See application file for complete search history.

(56) References Cited

U.S. PATENT DOCUMENTS 4,881,059 A * 11/1989 Saltzberg ............ H04L 25/4904
341/70
6,775,324 B1 * 8/2004 Mohan ................ G11B 20/1411
329/312
(Continued)

FOREIGN PATENT DOCUMENTS

EP    1528738 A2    4/2005
WO    2011142174 A1    11/2011

OTHER PUBLICATIONS

Ogmundson, Patrick G., "Zero-Crossing DPLL Bit Synchronizer with Pattern Jitter Compensation," IEEE Transactions Communications, vol. 39, No. 4, Apr. 1991 (10 pages).

Primary Examiner — David Payne
Assistant Examiner — Omar S Ismail
(74) Attorney, Agent, or Firm — Meenakshy Chakravorty

(57) ABSTRACT

A coded light receiver comprising a sensor for receiving coded light, a filter, and a timing and data recovery module. The coded light comprises a signal whereby data and timing are modulated into the light according to a self-clocking coding scheme. The filter is arranged to match a template waveform of the coding scheme against the received signal, thereby generating a pattern of filtered waveforms each corresponding to a respective portion of the data, and the timing and data recovery module recovers the timing from the signal based on characteristic points of the filtered waveforms. The timing and data recovery module is configured to do this by separating the filtered waveforms into different sub-patterns in dependence on the data, and to
(Continued)

recover the timing by processing each of the sub-patterns individually based on the characteristic points of each sub-pattern.

15 Claims, 7 Drawing Sheets

(51) Int. Cl.
*H04L 7/00* (2006.01)
*H04L 7/033* (2006.01)
*H04L 7/04* (2006.01)

(52) U.S. Cl.
CPC .............. *H04L 7/042* (2013.01); *H04L 25/49* (2013.01); *H04L 25/4904* (2013.01); *H04L 2007/047* (2013.01)

(56) References Cited

U.S. PATENT DOCUMENTS

| | | | | |
|---|---|---|---|---|
| 2006/0245765 | A1* | 11/2006 | Elahmadi | H04B 10/2513 398/189 |
| 2009/0041104 | A1* | 2/2009 | Bogdan | H03K 5/15013 375/226 |
| 2009/0110111 | A1 | 4/2009 | Kato et al. | |
| 2011/0154155 | A1 | 6/2011 | Abu-Surra et al. | |
| 2011/0164884 | A1 | 7/2011 | Yamada et al. | |
| 2011/0274153 | A1* | 11/2011 | Baker | G01R 13/0254 375/224 |
| 2014/0003817 | A1* | 1/2014 | Roberts | H04B 10/11 398/74 |

* cited by examiner

RECOVERING TIMING FROM A SELF-CLOCKING CODED LIGHT SIGNAL

CROSS-REFERENCE TO PRIOR APPLICATIONS

This application is the U.S. National Phase application under 35 U.S.C. §371 of International Application No. PCT/EP2014/057852, filed on Apr. 17, 2014, which claims the benefit of European Patent Application No. EP 13164495.7, filed on Apr. 19, 2013. These applications are hereby incorporated by reference herein.

TECHNICAL FIELD

The present disclosure relates to recovering timing from a coded light signal in which data is encoded according to a self-clocking coding scheme such as a Manchester type code or other line code.

BACKGROUND

Coded light refers to a technique whereby data is modulated into the visible illumination emitted by a light source, e.g. by an LED based luminaire. Thus in addition to providing illumination (for which purpose a light source may already be present in an environment), the light source also acts as a transmitter capable of transmitting data to a suitable receiver of coded light. The modulation is typically performed at a high enough frequency that it is imperceptible to human vision, i.e. so the user only perceives the overall illumination and not the effect of the data being modulated into that illumination. In this way the data may be said to be embedded into the light from the light source.

Coded light can be used in a number of applications. For instance, one application is to communicate between luminaires, e.g. as part of an intelligent lighting system. Each of a plurality of luminaires in an indoor or outdoor environment may be equipped with both a coded light transmitter and receiver, and the ability to communicate between them via coded light may be used to control the light in the environment in an at least partially distributed fashion. E.g. each luminaire may also be equipped with a presence sensor to detect presence of a being (typically a human), and information may be shared between two or more or the luminaires in order to determine how to control the light from the different luminaires in dependence on the detected presence.

In another example application, coded light may be used to provide information from a luminaire to a remote control unit for controlling that luminaire, e.g. to provide an identifier distinguishing it amongst other such luminaires which the remote unit can control, or to provide status information on the luminaire (e.g. to report errors, warnings, temperature, operating time, etc.). In one such example, the remote control unit may comprise a mobile user terminal such as smart phone or tablet having an inbuilt camera or other light sensor. With the terminal running a suitable application, the user can direct the camera at a luminaire and thereby detect the identifier coded into the light from that luminaire. Given the identifier of the luminaire it is looking at, the terminal may then control that luminaire by sending back a return signal (e.g. via RF).

In yet further applications the coded light may be used to provide information to a user, e.g. to provide identifiers of the luminaires for use in commissioning, or to enable provision of location related information. For example each luminaire in an indoor and/or outdoor environment (e.g. in the rooms and corridors of an office complex, and/or paths of a campus) may be arranged to emit light embedded with a respective identifier identifying it within that environment. If a user has a mobile terminal equipped with a camera or other light sensors, and an associated application for detecting coded light, the terminal can detect the identifier of a luminaire illuminating its current location. This can then be used to help the user navigate the environment, by looking up the current location in location database mapping the identifiers to locations of the luminaires. Alternatively or additionally, this may be used to look up information associated with the user's current location, such as information on exhibits in particular rooms of a museum. E.g. the look up may be performed via the Internet or a local network to which the terminal has access, or from a local database on the user terminal. Alternatively the information could be directly coded into the light from one or more luminaires. Generally speaking, the applicability of coded light is not limited.

One way to implement coded light is by amplitude keying, by switching the amplitude or power of the emitted light between discrete levels in order to represent channel bits (or more generally channel symbols). For instance in the simplest case, when the light source is on (emitting) this represents a channel bit of value 1 and when the light source is off (not emitting) this represents a channel bit of value 0, or vice versa. A photo sensor in the coded light receiver can detect when the light is on or off, or distinguish between the different levels, and thereby receive the channel bits or symbols.

In order to communicate data, the modulation typically involves a coding scheme to map data bits (sometimes referred to as user bits) onto channel symbols. An example is a conventional Manchester code, which is a binary code whereby a user bit of value 0 is mapped onto a channel symbol in the form of a pulse off-on or low-high (elementary channel bits 0 and then 1) and a user bit of value 1 is mapped onto a channel symbol in the form of a pulse on-off or high-low (elementary channel bits 1 and then 0), or vice versa. In many coding schemes such as Manchester coding and many other line codes, the clock and data are able to be recovered from the same signal (otherwise a separate clock would have to be sent or the transmitter and receiver would have to be assumed to be perfectly synchronized). A signal coded according to such a scheme may be referred to as self-clocking. As used herein, this means information contributing to both the recovery of timing and the detection of data is coded together into each (composite) channel symbol, i.e. each unit pulse of the coding scheme. A self-clocking signal having this property may also be described as isochronous, i.e. information for use in deriving timing and data is embedded in the period of each channel symbol (each unit pulse of information). Where each channel symbol represents a user bit, as in Manchester coding, this means both timing and data information is embedded into the period of each user bit.

FIG. 8 illustrates an example of how timing and data may be recovered from a self-clocking signal. FIG. 8a shows an example of a signal as transmitted over a coded light channel, and below that FIG. 8b shows the corresponding signal as received at a coded light receiver. In this example the data in the signal is coded according to a conventional Manchester code. The received signal is passed through a matched filter as well as one or more other filters such as a low pass filter. The matched filter correlates a template pulse against the received signal. The template pulse is one of the possible symbols of the coding scheme in question; e.g. in the case of the Manchester code, the pulse on-off or low-high representing a user bit of value 1. The output of this correlation by the matched filter is a sequence of non-rectangular pulses, as illustrated in FIG. 8c for the example Manchester coded signal. Note how the shape of each filtered pulse depends not only on the user bit represented by the corresponding symbol, but also on the adjacent bits represented by the adjacent symbols. The shape is a result of the matched filtering, the low pass filtering and inter-symbol interference.

The timing recovery can be considered in terms of an "eye pattern", the concept of which will be familiar to a person skilled in the art. The filtered signal is arranged into multiple windows, each window comprising the waveform of one of the filtered pulses or of a consecutive sequence of the filtered pulses (i.e. of one or more of the channel symbols). If several of these windows are overlaid with one another as if contemporaneous, i.e. with the symbol periods of the different windows aligned, then a pattern of open "eyes" emerges. FIG. 8d shows an eye pattern for the unfiltered received signal and FIG. 8e shows the eye pattern for the filtered version of the signal. In the filtered signal (FIG. 8e) the data detection points correspond to positive or negative peaks of the eye diagram (shown circled), e.g. where the matched filter correlates a symbol representing a user bit of value 1 with the template pulse this outputs a positive peak and where the matched filter correlates a received symbol representing a user bit of value 0 with the template this results in a negative peak (a trough). In between these data detection points, the waveforms of the eye pattern have points crossing zero. The timing of these zero-crossings allows the clock to be recovered.

FIG. 8 illustrates a theoretical situation with no noise present. However, in reality the eye pattern will be blurred due to noise in the signal, resulting in a jitter in the recovered clock signal. A digital phase-locked loop (DPLL) operating on zero crossings using data-dependent jitter compensation has been described for example by Patric G Ogmundson et al, "Zero-Crossing DPLL Bit Synchronizer with Pattern Jitter Compensation" (IEEE Trans-COM, Vol. 39, No. 4, April 1991). This method minimizes the residual clock jitter for systems requiring high clock accuracy for a relatively high SNR (high order QAM data transmission systems or synchronization of power systems). Also typically, the zero crossings are on a regular grid, disturbed by noise and data-dependent jitter resulting from inter-symbol interference (ISI).

SUMMARY

It may have been considered how to deal with jitter in presence of a certain amount of noise. However, there is still a potential problem in that if the relative noise is too severe then characteristic points such as zero-crossings used to recover timing may become too indistinct to individually process, at least with a desired reliability. E.g. see FIG. 10a.

The present invention separates the waveforms output from the matched filter into two separate groups or "sub-patterns" before recovering the timing from characteristic points such as zero crossings. The separation is based on the user data represented by the waveforms being separated, for instance so that if two consecutive bits of the data are the same a waveform is allocated to one sub-pattern and if the two consecutive bits are different the waveform is allocated to a second sub-pattern. E.g. see FIG. 10b. Thus exploiting knowledge of the data, it is possible to make the zero crossings or other such characteristic points more discernible in each individual sub-pattern.

According to one aspect the disclosure herein, there is provided a coded light receiver comprising a sensor for receiving coded light, a filter, and a timing and data recovery module. The coded light comprises a signal whereby data and timing are modulated into the light according to a self-clocking coding scheme. The filter is arranged to match a template waveform of said coding scheme against the received signal, thereby generating a pattern of filtered waveforms each corresponding to a respective portion of said data, and the timing and data recovery module recovers the timing from said signal based on characteristic points of said filtered waveforms. It is configured to do this by separating the filtered waveforms into different sub-patterns in dependence on the data, and to recover the timing by processing each of the sub-patterns individually based on the characteristic points of each sub-pattern.

According to another aspect there is provided a computer program product comprising code embodied on a computer readable medium and being configured so as when executed on a processor to operate a coded light receiver to perform timing recovery in accordance with the disclosure herein.

BRIEF DESCRIPTION OF THE DRAWINGS

For a better understanding of the present disclosure and to show how embodiments may be put into effect, reference is made by way of example to the accompanying drawings in which.

DETAILED DESCRIPTION OF EMBODIMENTS

In decoding a signal coded according to a scheme such as a Manchester code or a ternary Manchester (see below), the receiver will perform a time base regeneration using the received signal. To do this, a digital phase-locked loop (DPLL) is placed after a matched filter (to mitigate interference and noise) and uses the zero crossings of the filtered signal to recover the timing. In presence of too much noise the DPLL may not be able to resolve the data-dependent, closely-spaced zero crossings. However, a DPLL may be able to resolve the zero crossings if it uses a data-dependent zero crossing recognition in accordance with the following embodiments.

A method is provided for jointly recovering data and a time base from a self-clocking data stream, in embodiments a ternary Manchester coded data stream. The method may comprise (i) filtering a detected data stream with matched filter for extracting data bits; (ii) applying a digital phase-locked loop (DPLL) operating on the filtered data stream to form an eye pattern for detecting the zero crossings in the filtered data stream to recover the time base; and (iii) subdividing the eye pattern into a first sub-pattern and a second sub-pattern in dependence of the value of two consecutive bits, wherein the first sub-pattern is formed if the values of the two bits are equal, and wherein the second sub-pattern is formed if the values of the two bits are unequal.

Advantageously, separating the eye pattern into two sub-patterns allows for uniquely determining the zero crossings and assigning them to the underlying signal in a ternary Manchester coded data stream for which the zero-crossings are data dependent. For two consecutive bits being equal, this results in two well separated zero crossings in the first sub-pattern. In contrast, for two consecutive bits being unequal, this results in a single zero crossing in the second sub-pattern. See for example FIGS. 9-10 which will be discussed in more detail later.

Figure 1:
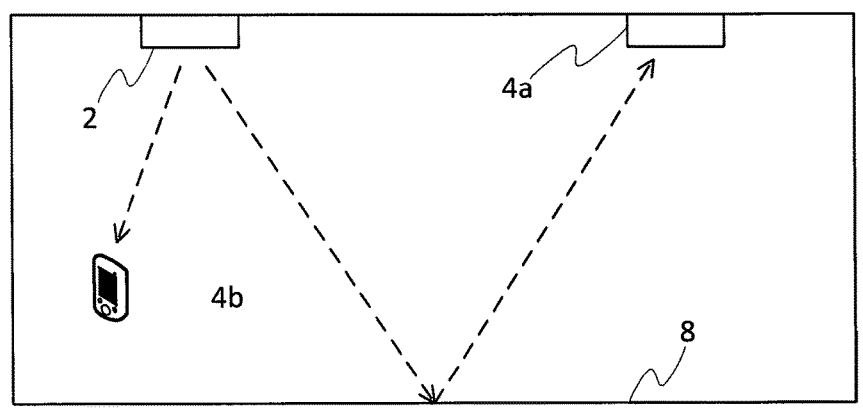
FIG. 1 is a schematic illustration of an environment comprising a coded light transmitter and receiver.

FIG. 1 illustrates an example of an environment in which the present invention may be employed, e.g. an office, home or other room or indoor space. The environment comprises a coded light transmitter 2 such as a luminaire, e.g. mounted on a ceiling or wall, installed for the primary purpose of illuminating the environment but also having the secondary function of providing data embedded into the illumination output using coded light techniques. The environment further comprises a coded light receiver 4. For example, the coded light receiver may be included in another luminaire 4a, e.g. as part of an intelligent lighting system. Alternatively the coded light receiver may be a component of a user terminal 4b such as remote control unit for controlling the transmitting luminaire 2, or of a mobile user terminal such as smart phone, tablet or laptop for deriving information from the transmitting luminaire 2 (e.g. location related information or information for use in commissioning).

In some situations, the light of the transmitting luminaire 2 reaches the receiver 4 via one or more reflections from one or more surfaces 8 such as the floor or walls. With increasing distance between the lamp of the transmitting luminaire 2 and the receiver 4, the received signal strength at the receiver 4 decreases. For example at an extreme range of coded light communication, the visible light signal may be received with an amplitude of about 0.1 Lux. A weakly received signal like this may be susceptible to random noise. In other situations, even if the signal is received directly it may be received over a large distance and/or in an environment contributing a relatively large amount of noise. It would therefore be desirable to provide a coded light receiver that is more robust against noise in recovering timing from a self-clocking signal.

Figure 2:
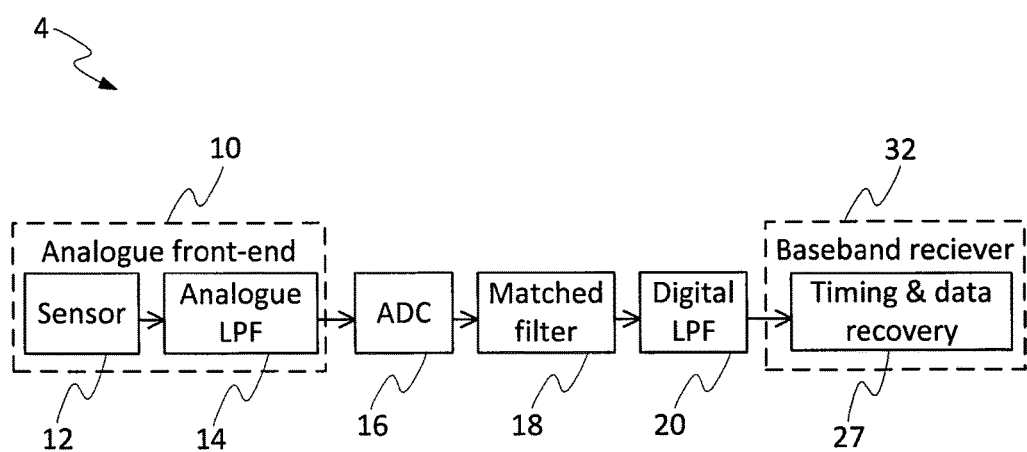
FIG. 2 is a schematic block diagram of a coded light receiver.

FIG. 2 gives an example block diagram of a coded light receiver 4, configured to perform timing recovery in accordance with embodiments of the present disclosure. The receiver 4 comprises an analogue front-end 10, comprising a light sensor 12 and an analogue low pass filter (LPF) 14. The receiver 4 further comprises an analogue to digital converter (ADC) 16, a matched filter 18, a digital low pass filter (LPF) 20, and a baseband module 32. The light sensor 12 has an output coupled to an input of the analogue LPF 14. In turn, the analogue LPF 14 has an output coupled to an input of the ADC 16, the ADC 16 has an output coupled to an input of the matched filter 18, the matched filter 18 has an output coupled to an input of the digital LPF 20, the digital LPF 20 has an output coupled to an input of the baseband module 32. The baseband module 32 comprises a timing & data recovery module 27.

Each of the digital components 18, 20 and 32 may be implemented in software stored on a storage device of the receiver 4 and arranged for execution on a processor of the receiver 4. Alternatively some of all of these components may be implemented in dedicated hardware circuitry, or configurable hardware circuitry such as an FPGA, or a combination of software and hardware.

Figure 5:
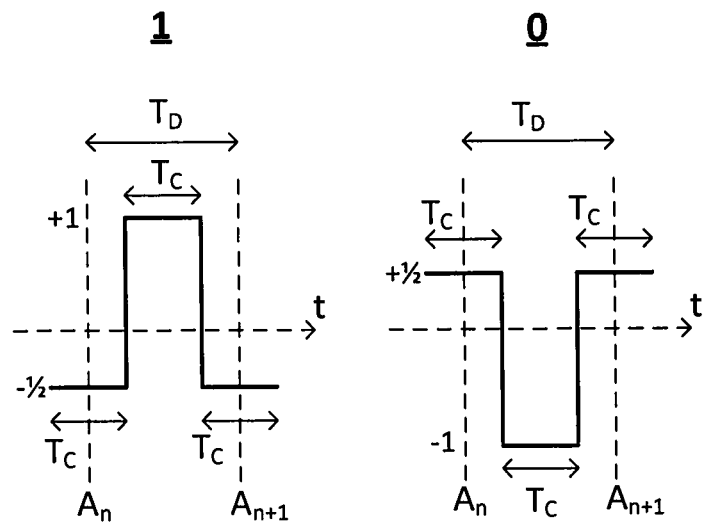
FIG. 5 is a schematic representation of the pulse wave forms of a ternary coding scheme.
Figure 6:
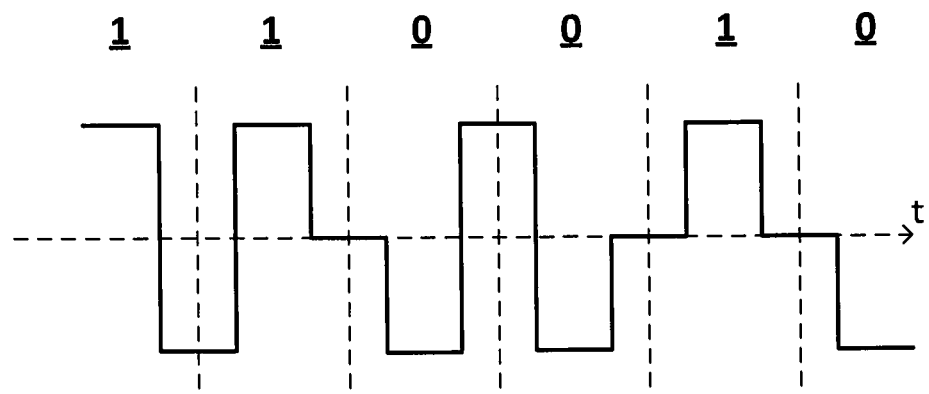
FIG. 6 is a schematic representation of a sample sequence of bits coded according to a ternary coding scheme.

In operation, the light sensor 12 receives incoming light comprising a coded light signal from the transmitter 2, including potential noise. The coded light signal comprises data coded into the light using a coding scheme. In embodiments, the coding scheme used is one of the applicant's own creation and is referred to herein as a ternary Manchester code. This is illustrated in FIGS. 5 and 6.

At the transmitter 2 each data bit to be transmitted is mapped to a channel symbol in the form of a respective unit pulse. According to this scheme, there are two possible units, in the form of positive and negative "hat" functions as shown in FIG. 5. The pulse mapped to a data bit of value 1 is shown on the left hand side of FIG. 5, and the pulse mapped to a data bit of value 0 is shown on the right hand side of FIG. 5. A data bit is a bit of actual information to be transmitted, sometimes referred to as "user data" (even if not explicitly created by a user). The data bit period is labeled $T_D$ in FIG. 5, with the boundaries between user bit periods shown with vertical dashed lines.

Each unit pulse comprises a sequence of elementary channel periods of length $T_C$ in time, smaller than the user bit period. Each elementary channel period conveys just one of the elementary levels that the coded signal can take, and is not alone sufficient to convey data without being modulated into a composite channel symbol. Hence each of these channel symbols (of length $T_D$) is the smallest or most fundamental unit of user information that can be conveyed using the coding scheme in question.

In the ternary Manchester code, each unit hat function comprises a sequence of three elementary channel periods of length $T_C$ in time, each half the length of the data bit period $T_D$ ($T_D = 2T_C$). The three elementary periods for a respective data bit are contiguous, with the middle of the three being located at the center of the respective data bit period, so that the adjacent first and third elementary channel periods straddle the beginning and end boundaries of the data bit period respectively by half an elementary channel period $T_C$ either side.

For a data bit of value 1, this is mapped to the positive hat function shown on the left of FIG. 5. The positive hat function comprises: a first elementary channel period of height $-\frac{1}{2}$ centered on the beginning (earlier) boundary of the respective data bit period, followed by second (middle) elementary channel period of height +1 being centered on the respective data bit period, followed by a third elementary channel symbol of height $-\frac{1}{2}$ centered on the end (later) boundary of the respective data bit period. The "height" at this stage may be represented in any suitable terms such as a dimensionless digital value.

For a data bit of value 0, this is mapped to the negative hat function shown on the right of FIG. 5. The negative hat function comprises: a first elementary channel period of height $+\frac{1}{2}$ centered on the beginning (earlier) boundary of the respective data bit period, followed by second (middle) elementary channel period of height $-1$ being centered on the respective data bit period, followed by a third elementary channel period of height +½ centered on the end (later) boundary of the respective data bit period.

To create the coded bit stream to be transmitted, the hat functions of adjacent user bits are added to one another, offset by the times of their respective bit periods. Because the hat functions overlap across the boundaries between data bit periods, the functions add in the overlapping regions between adjacent data bits. That is, the hat functions are joined along the boundaries, so the earlier boundary $A_n$ of one data bit period is joined with the later bit boundary $A_{n+1}$ of the preceding adjacent data bit period, with the height of the signal being summed where the two adjacent pulses overlap. An example of a resulting sequence of channel symbols in the time domain is shown in FIG. 6.

Where two adjacent data bits are of value 1, this means the two overlapping elementary channel periods of height −½ add to a height of −1. Where two adjacent data bits are of value 0, the two overlapping elementary channel periods of height+½ add to height+1. Where two adjacent data bits are of different values, the two overlapping elementary channel periods of height +½ and −½ add to 0. Thus in the coded stream, each user bit period (or each channel symbol or unit pulse) takes the form of either a positive pulse of a rectangular wave when a user bit of value 1 is sandwiched between two adjacent user bits of value 1, or a negative pulse of a rectangular wave when a user bit of value 0 is sandwiched between two adjacent user bits of value 0, or an uneven pulse of one or four possible configurations with straight edges when at least one of the adjacent user bits is different.

In an equivalent variant, the mapping of data bit values 0 and 1 to positive and negative hat functions may be reversed.

The resulting signal (e.g. that of FIG. 6) is then converted into a variation in the signal strength output by the transmitting light source 2 (whether represented in terms of amplitude or power). For example, elementary channel symbol −1 may be represented by a low light output level (e.g. light is turned off), the elementary channel symbol +1 may be represented by a high output light level (e.g. light is turned on), and the elementary channel symbol 0 may be represented by an intermediate light level between the high and low (e.g. the light is at half the output power or amplitude).

The ternary Manchester code can be advantageous as it provides a smoother transition when the data bits change value than a conventional Manchester code, and results in a spectrum in the frequency domain that is more suppressed around low frequencies where interference such as mains hum may occur. However, the applicability of the present disclosure is not limited to ternary Manchester and in other embodiments other examples of suitable coding schemes may be used, e.g. a conventional (binary) Manchester code, or other conventional binary or ternary lines codes.

Whatever scheme is used, the light sensor 12 at the receiver 4 detects the light and generates an electronic signal representative of the received light level (e.g. amplitude or power) as a function of time. The light sensor outputs this electronic signal through the analogue LPF 14 to the ADC 16 which samples it, e.g. at 64 kHz, to produce a digital representation of the signal.

The ADC 14 outputs the digital version of the signal to the matched filter 18. The matched filter 18 acts to correlate a template pulse against the received signal. The template is one of the unit pulses of the coding scheme being detected, e.g. in the case of the ternary Manchester code the template may be the positive hat function shown on the left-hand side of FIG. 5 (or in an alternative implementation it could be the negative hat function). By correlating the template against what is received, this enables the matched filter 18 to detect presence of a signal based on the coding scheme associated with that template, in a manner that minimizes signal-to-noise ratio.

The matched filter 18 passes its output to the digital LPF 20 where further low-pass filtering is applied, e.g. with a 4 kHz pass band, and the digital LPF 20 passes the output of this to the baseband receiver 32 for baseband processing. The baseband processing comprises functions such as carrier sense of power surge detection, clock generation, frame sync detection, and joint clock and data recovery 27.

Figure 3:
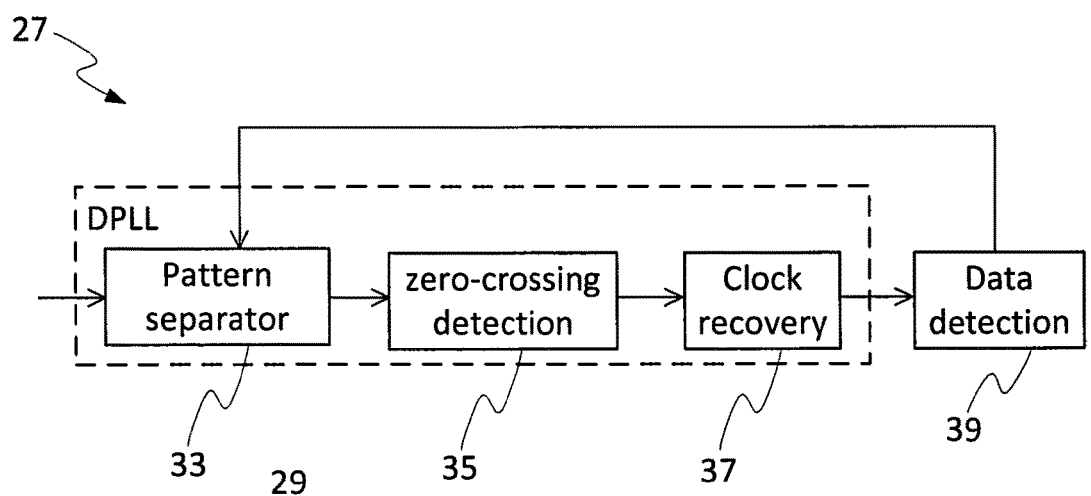
FIG. 3 is a schematic block diagram of a timing and data recovery module for a coded light receiver.
Figure 4:
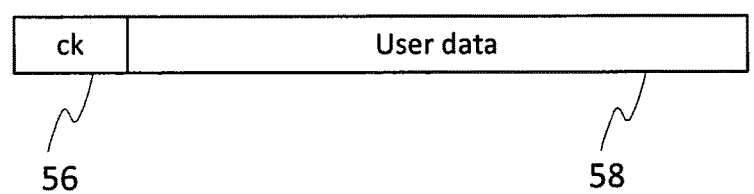
FIG. 4 is a schematic representation of a packet of data as may be transmitted in coded light.

FIG. 3 gives a schematic block diagram of a timing & data recovery module 27 which may be implemented as part of the baseband module 32 in accordance with embodiments disclosed herein. The timing & data recovery module 27 comprises a digital phase-locked loop (DPLL) 29, comprising a pattern separator 33, zero-crossing detection module 35 and clock recovery module 37. The timing & data recovery module 27 also comprises a data detection module 39. The pattern separator 33 is arranged at the input of the DPLL 29, having an input coupled to receive the output of the digital LPF 20 (via which the signal from the matched filter 18 is supplied). The pattern separator 33 has an output coupled to an input of the zero-crossing detection module 35, and in turn the zero-crossing detection module 35 has an output coupled to an input of the clock recovery module 37, and the clock recovery module 37 has an output coupled to the input of the data detection module 39. The data detection module 39 also has an output coupled to feedback values of detected data bits to a second input of the pattern separator 33.

In operation, the pattern separator 33 takes filtered waveforms output from the matched filter 18 (via the digital LPF 20) and separates these into at least two different sub-patterns in dependence on data detected from the signal, as will be discussed in more detail shortly. The zero-crossing detection module 35 operates on each of these sub-patterns individually to detect zero-crossings in the waveforms of each sub-pattern. That is, it detects zero-crossings in one sub-pattern excluding the contribution from the waveforms of the other sub-pattern, and independently or separately detects zero-crossings in the other sub-pattern excluding the contribution from the waveforms of the first sub-pattern. The clock recovery module 37 then recovers the timing, i.e. the clock embedded in the received signal, using the zero-crossings detected by the preceding module 35. The recovered clock is output to the data detection module 39 which uses it to find the data detection points of further data bits to be detected. As well as being output for use in whatever application the data is intended, this newly detected data is also fed back to the pattern separator 33 to inform further data-dependent pattern separation and timing detection.

Figure 7:
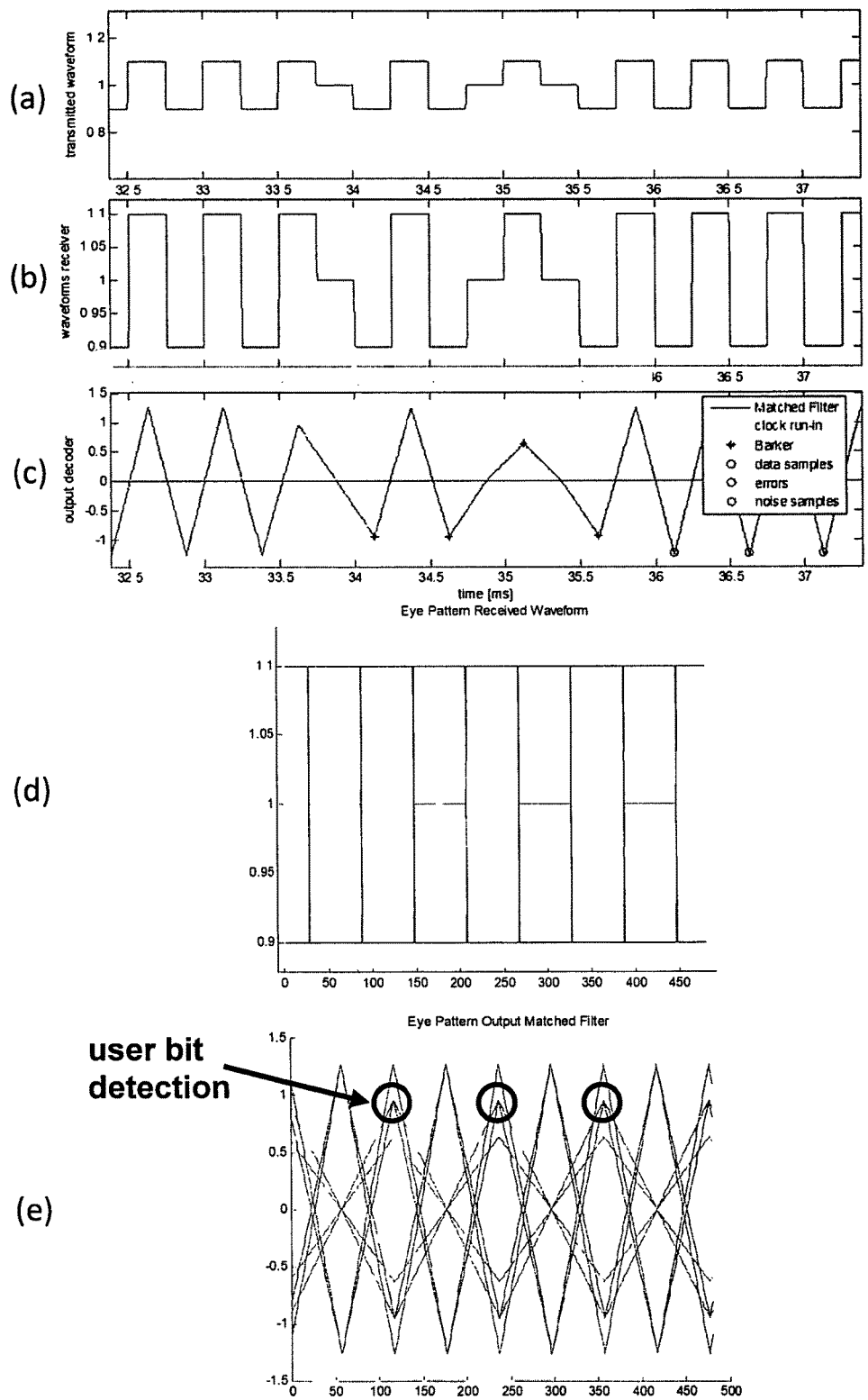
FIGS. 7a-7e show a theoretical example of a received signal, corresponding output of a matched filter, and corresponding eye pattern.

FIG. 7 illustrates a theoretical example of a ternary Manchester data stream with no noise, and the effect of passing this through the Matched filter 18 for timing and data recovery. FIG. 7a shows an example of a signal as transmitted over a coded light channel, and FIG. 7b shows the signal as received by the coded light receiver 4. Each user bit period comprises one of the discrete set of pulses of the ternary Manchester code (in the form they take when summed into an encoded bit stream) as discussed above in relation to FIG. 6. Each unit pulse represents a respective channel symbol comprising information relevant to both timing and data.

When passed through the matched filter 18, this generates a sequence of filtered pulses each resulting from correlating the template pulse against the actual pulse of a respective one of the user bit periods. This is illustrated in FIG. 7c. The timing & data recovery module 27 detects data (user bits) based on the peaks of these filtered pulses. A positive peak results from the correlation of the template pulse representing a 1 in the original coding scheme (in this case the positive hat function) with a pulse in the received signal representing a user bit of value 1. A negative peak (also called a trough) results from the correlation of the template pulse representing a 1 in the original coding scheme (again the positive hat function) with a pulse in the received signal representing a user bit of value 0. Hence the timing & data recovery module 27 interprets a positive peak as a user bit of value 1 and a negative peak as a user bit of value 0.

Note that to obtain the initial timing of the data detection points, the timing & data recovery module may use a known preamble in the received signal. This then allows data dependent timing detection to be performed to continue to track the timing, which in turn allows detection of further data based on the tracked timing, and so forth.

The timing can be recovered using what is known as an "eye pattern". This refers to a representation based on multiple windows of the received signal, each window being formed of one or more of the unit pulses, i.e. each corresponding to one or more user bit periods. Typically window consists of a consecutive sequence at least two of the unit pulses, i.e. at least two consecutive user bit periods. Several of these windows are then overlaid in time as if contemporaneous with one another. Each window may consist of an integer number of bit periods. The windows are aligned in time according to the data period so that the one or more periods of one window is or are aligned with the one or more corresponding periods of each other window. I.e. so the beginning of the a user bit period of each window is represented as if starting at the same time as the beginning of a corresponding bit period of each other of the windows being considered. Put another way, the user data period is used to trigger the horizontal sweep, or the windows are represented on a common time base. The concept of an eye diagram will in itself be familiar to a person skilled in the art.

FIG. 7d shows an example of an eye pattern for the received signal of FIG. 7b, and FIG. 7e shows an example eye pattern for the filtered signal of FIG. 7c after having been passed through the matched filter 18.

Figure 8:
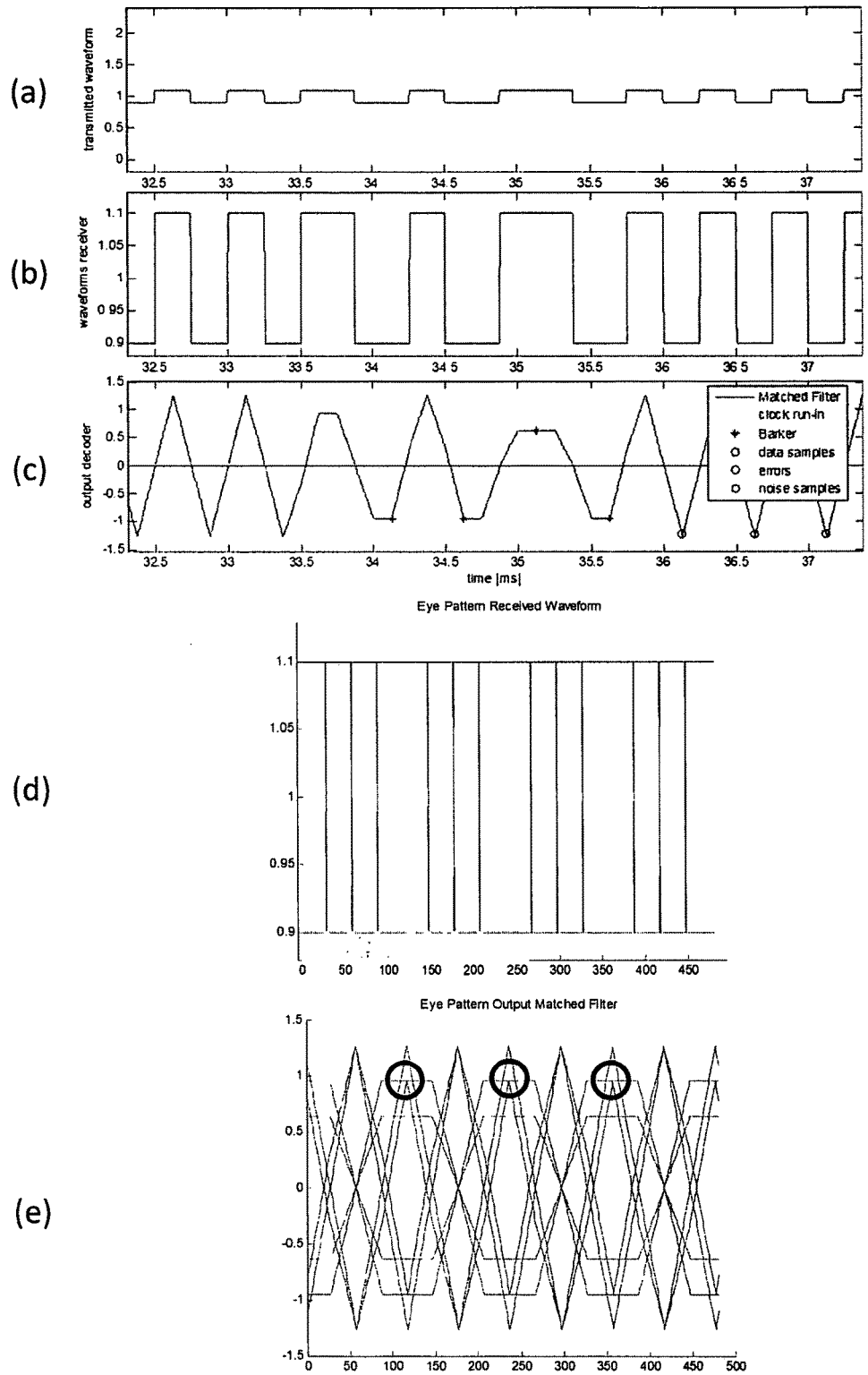
FIGS. 8a-8e show a theoretic example of another received signal, corresponding output of a matched filter, and corresponding eye pattern.

FIG. 8 shows a similar set of theoretical plots for a conventional (binary) Manchester coded data stream.

As will be seen from FIGS. 7e and 8e, the eye pattern is so called because the overlaid waveforms corresponding to the different user bits form a pattern of open "eyes". The peaks correspond to points from which user bit detection can be performed, and the pattern of zero-crossings between there user bit detection points can be used to recover the timing, i.e. the clock that is embedded in the signal. This in itself will be understood by a person skilled in the art.

In order to minimize the disturbances due to noise and interference, the timing of the embedded clock may be recovered from the received signal after the matched filter 18. Also, by using zero crossings, there may be achieved the additional benefits of: eliminating the effect of signal amplitude on the loop gain of the PL, reducing the phase noise (timing jitter) by using soft-decision information and ISI correction, and/or minimizing computational complexity by letting the PLL only act on zero crossings instead of computing inner products of the received signal and a sine wave.

For ternary Manchester, it turns out that the zero crossings are not on a regular grid. The zero crossings form a data-dependent sequence of zero crossings. Under heavy noise conditions, it is not necessarily possible to uniquely extract signals for the DPLL from zero crossings.

In accordance with embodiments disclosed herein, the timing & data recovery module 27 allows for unique extraction of an error signal for the DPLL from the zero crossings that are found, using knowledge from the surrounding bits to uniquely fix the number and the moments of the zero crossings in between.

FIG. 9a shows the eye pattern of ternary Manchester for a relatively high signal-to-noise ratio, i.e. relatively low noise. The time instances of user bit detection are indicated by the bold circles. These time instances may be delivered by a DPLL that is locked onto the received waveform.

The zero crossings between two consecutive user bits are indicated by the bold oval. Note that there are three closely-spaced zero crossings. If we subdivide the eye patterns according to two consecutive bits being equal or unequal, the two eye patterns are obtained as shown in FIG. 9b. For two consecutive bits being equal, it is possible to obtain two zero crossings in between that are well separated. For two consecutive bits being unequal, there is only one zero crossing. Hence, knowledge of surrounding data can be used to separate time instances of zero crossings of the underlying signal and thereby in increase the allowed deviations of zero crossings.

Figure 10:
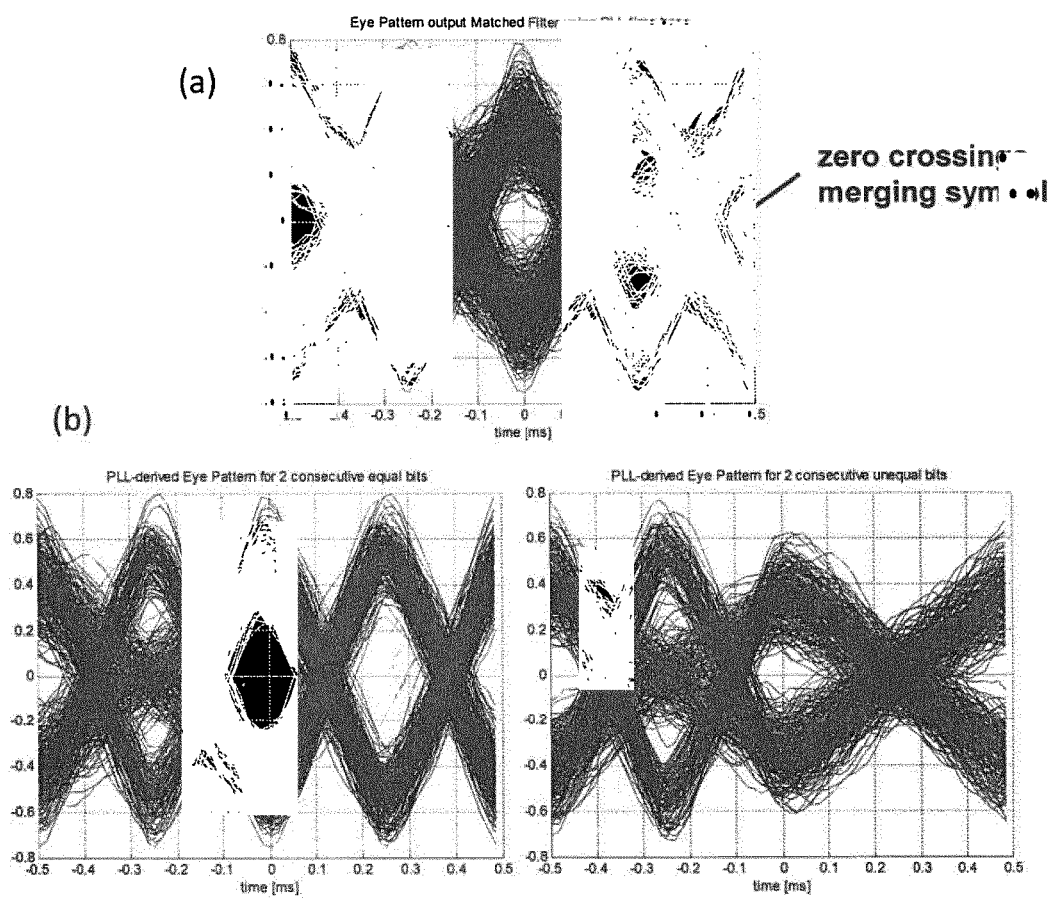
FIGS. 10a-10b show further simulated eye patterns in presence of strong noise.

FIG. 10 shows similar eye patterns, but now under relatively heavy noise conditions (low SNR). Note that without knowledge of data (FIG. 10a), zero crossings of a received signal may not be able to be uniquely attributed to the first, the second, or the third hypothetical zero crossing of the underlying received signal, thereby preventing the computation of a uniquely determined error signal for the DPLL.

However, by splitting up the eye patterns according to two consecutive bits being equal or unequal (FIG. 10b), it is possible to obtain nicely separated zero crossings that can be uniquely assigned to the underlying signal. Note also that the update rate of the DPLL is a random variable (considering the user data to be effectively random), having two zero crossings if two consecutive bits are equal and one zero crossing if two consecutive bits are unequal.

To exploit the above observations, where a conventional DPLL would simply operate on a representation of single eye pattern, the DPLL 29 of the timing & data recovery module 27 comprises a pattern separator 33 configured to generate two separate eye patterns depending on the data. The pattern separator 33 receives the sequence of filtered pulses output by the matched filter 18 (via the digital LPF 20) and arranges into two different sub-patterns representing two different eye patterns.

Note that the eye patterns in FIGS. 7-10 are illustrated as would be seen on oscilloscope. Of course the DPLL 29 or pattern separator 33 doesn't have to actually generate the eye patterns in this form. Where it is said the DPLL of some component of it generates or uses an eye pattern (or the like), this does not mean it has to generate a graphical representation. In practice the generating of an eye pattern may only comprise determining any relevant points of the waveforms and representing then in a manner that allows the timing of these points to be analyzed in relation to points from other waveforms of that pattern, and/or in relation to a common time base.

Figure 9:
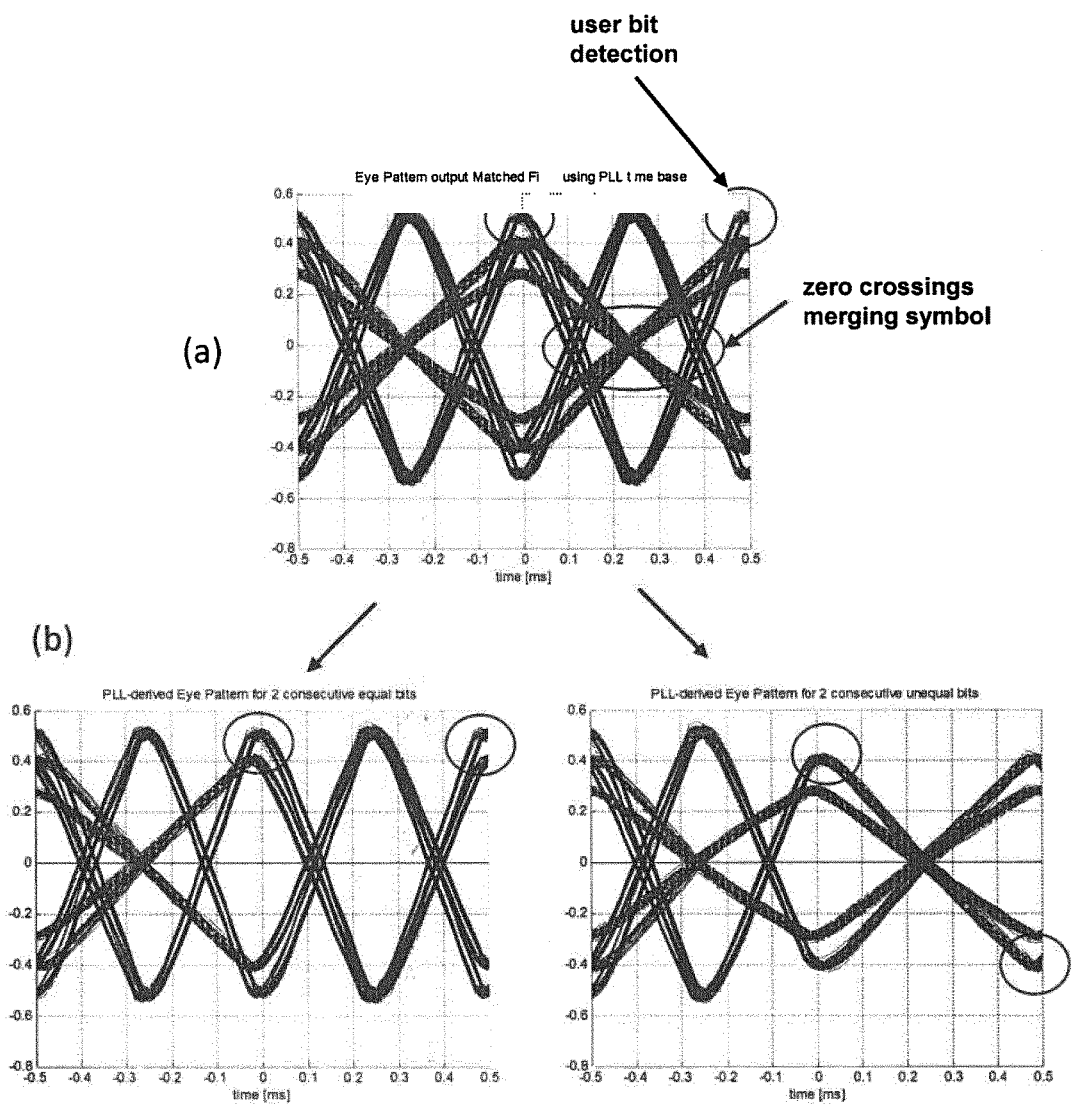
FIGS. 9a-9b show simulated eye patterns in presence of some noise.

Each sub-pattern is formed by overlaying several windows of the received, filtered signal on a common time base. In the example of FIGS. 9 and 10, each window consists of the waveform of two user bit periods, i.e. two symbols of the received, filtered signal. These are represented as if the two bit periods of each window are aligned in time with the two bit periods of each other window in the sub-pattern, i.e. so the beginning of the first user bit period of each window in the respective sub-pattern is treated as aligned with the beginning of the first user bit period of each other window of that respective sub-pattern, and the end of the second (last) user bit period of each window in the respective sub-pattern is treated as aligned with the end of the second (last) user bit period of each other window of that respective sub-pattern.

For the waveform of each window, the pattern separator 33 determines the two user bits represented by the two symbols of the two user bit periods of that respective window. The detection points for these data bits are shown circled in FIGS. 9 and 10. The positions of the data detection points may be determined by the data detection module 39 based on a previously determined fix on the timing (which is to continue to be tracked by the subsequent data-dependent timing recovery). In between these two detection points are found the one or more zero-crossings of the respective waveform, which are to contribute to the subsequent timing recovery. On condition that the respective pair of user bits are the same (both 1 or both 0), the pattern separator 33 allocates the respective waveform to the first sub-group; and on condition that the respective pair of user bits are different (01 or 10), the pattern separator 33 allocates the respective waveform to the second sub-group. The separation of the waveforms into groups is illustrated in FIGS. 9b and 10b.

The result is plurality of overlaid waveforms in each sub-pattern. Each individual filtered waveform is the result of a correlation of a single template pulse with a sequence of received pulses taken from a discrete set of possible pulses (by the matched filter 18). This means each filtered waveform is approximately one of a discrete set of possible waveform shapes (note there may be more possible waveform shapes than the possible combinations discussed in relation to FIG. 7, due to an effect of inter-symbol interference extending beyond the two adjacent bits of a given user bit).

The zero-crossing detection module 35 of the DPLL 29 is arranged to detect the positions of zero-crossings in each sub-pattern. Each zero-crossing in each sub-pattern gives some information relating to the timing of the clock signal being recovered from the received signal, e.g. can be related to the position of a clock edge relative to the current time base or this space between two or more zero-crossings can be related to the clock period or frequency. The clock recovery module 37 of the DPLL 29 can use this information to track the clock signal by relating the position to other zero-crossing positions from the current sub-pattern or sub-patterns and/or one or more previous sub-patterns, and/or to a current version of the time base tracked or synchronized from a previous stage. The clock recovery module 37 can thereby recover information on the timing of the embedded clock such as the position of a clock edge, the clock period and/or the clock frequency.

In a theoretical scenario, for a given one of the possible waveform shapes, each instance of that waveform would be identical and if multiple instances were overlaid they would exactly coincide as shown in FIG. 7e. However, in reality, noise will cause a variation in the different instances such that they will only approximate the shape in question. Therefore when many actual waveforms windows overlaid in an eye pattern, noise will cause the shapes to be spread or "smeared" out and each zero-crossing will have an error associated with it. FIG. 9 shows eye patterns for a signal in a relatively modest amount of noise.

The reason for processing multiple windows of the signal together in an eye pattern is so that the effect of different instances of the waveforms can be averaged out. So the position of a zero crossing may be determined from an average (e.g. mean) of the position of that zero-crossing in multiple waveforms (multiple instances of a waveform of a given shape). Here the zero-crossing in an eye pattern refers to a given crossing point, as crossed by multiple instances of the waveforms in the sub-pattern. Each of the discrete waveform shapes that are possible has a characteristic zero-crossing point between data detection points, and the zero-crossings of some of the shapes may coincide. For example, referring to FIGS. 9b and 10b, the first sub-pattern (left hand side of the figure) has two zero-crossings between the two consecutive data detection points, resulting from the waveforms corresponding to user bits 11 and 00. The second sub-pattern has one zero-crossing between the two consecutive data detection points, resulting from the waveforms corresponding to user bits 10 and 01.

In embodiments, the clock recovery module 37 is configured to determine an error associated with each zero-crossing, and to determine the clock timing recovered from the signal as function of the positions of each of the zero-crossings in each sub-pattern weighted according to the respective error (or information derived from the positions weighted according to the respective error). That is, a zero-crossing with a greater error is given less weight in the timing recovery computation, whereas a zero-crossing with less error is given a greater weight.

The process of determining the timing of a self-clocking signal from an eye pattern generally is in itself understood by a person skilled in the art. However, in accordance with embodiments disclosed herein, the determination is performed by first splitting waveforms into separate "sub" eye patterns and processing each of these sub-patterns individually. Thus referring to the example of FIGS. 9b and 10b, the position and error of each of the two zero crossings in the first sub-pattern are determined, ignoring the effect of the waveforms from the second sub-pattern; and separately, the position and error of the one zero-crossing in the second sub-pattern are determined, ignoring the effect of the waveforms from the first sub-pattern. After the separate processing, information derived from each sub-pattern is combined to obtain an updated timing fix. For example an updated clock period or frequency may be determined as a function of the position of each of the three zero-crossings each weighted according to its respective error (so zero-crossings with more error are given less weight).

Without separating into sub-patterns, this will not work in some noise conditions. FIG. 10 shows an example in high noise conditions. Using a single eye pattern as in FIG. 10a, the individual zero-crossings are not distinct from one another and an individual error cannot be determined for each. Hence the clock timing cannot be tracked. However if the waveforms are separated into separate patterns in dependence on the data as in FIG. 10b, the zero crossings from the different waveform shapes become distinct and an individual error can be determined for each based on the spread on the time axis at the respective zero crossing. Hence the clock timing can be recovered.

In accordance with an additional embodiment disclosed herein, the error assigned to some or all of the zero crossing points can be made dependent on the slope of the respective waveform shape or shapes. This is based on a recognition that some zero crossings give less information than others, depending on the slope (gradient) at the point where the waveform crosses the vertical axis. A lower (shallower)

slope tends to have more additive noise and so more timing jitter, and so one or more zero-crossings from waveforms having a shape with lower slope are allocated a greater error (less weight) in the timing recovery than one or more zero-crossings from waveforms having a shape with greater (steeper) slope at these points.

It will be noted that in the embodiments of data-dependent timing recovery disclosed above, this involves looking ahead to data in a part of the signal from which timing has not yet been recovered. As mentioned, to get the process started an initial synchronization may be used to obtain an initial timing fix. In embodiments, the coded light data may be transmitted in one or more packets, an example of which is illustrated in FIG. 8. The packet comprises a payload 58 comprising the user data discussed above, and also a header 56 comprising a preamble for use in initial synchronization. The preamble may comprise a clock signal, comprising a plurality of cycles of a sinusoid, e.g. 20 cycles at 2 kHz. The clock recovery module 38 may be arranged to use this preamble to obtain an initial synchronization, and the data detection module 39 may be arranged to determine the positions of data detection points to obtain some initial data readings based on this initial synchronization. The first data dependent timing recovery can then be performed to update the timing based on this initial data, and further data obtained using the updated timing, then this further data used to inform a second timing determination and so forth.

It will be appreciated that the above embodiments have been described only by way of example.

For instance, the techniques disclosed herein are not limited to being implemented in terms of any particular measure of signal strength. E.g. signal strength may be expressed in in terms of power or amplitude. Further, it will be appreciated that signal energy accumulated over a given time is a measure of power.

Further, the separation into sub-patterns is not necessarily based on the relative values of the data bits being detected, i.e. whether bits are the same or different. Alternatively or additionally, the sub-patterns could be separated from one another on the basis of the absolute values of bits, e.g. the waveforms for user bits 11 could be separated into a sepatat5e sub-pattern than those representing user bits 00.

Further, the invention is not limited to dividing the waveforms into only two groups, not to doing so based on only two consecutive bits. Generally the received, filtered waveforms may be separated into more than two groups based on other patterns of data. For example in embodiments three consecutive bits could be used to divide waveforms of three user bit periods in length, and this may allow division into. The use of more bits could be exploited to take into account inter symbol interference extending beyond the immediately adjacent bits.

Further, the timing recovery could be based on other characteristic points than zero crossings, e.g. positive and/or negative peaks, and/or peaks or zero crossings in the first derivative, and/or second derivative, etc.

A skilled person may implement other ways of exploiting knowledge of data to separate sub-patterns given the disclosure herein. Any implementation of this idea may provide the advantage of allowing characteristic points such as zero crossings to become more distinct in presence of some amount of noise, where they would not otherwise have been distinct enough to individually identify.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A coded light receiver, comprising:
   a sensor for receiving coded light, the coded light comprising a signal whereby data and timing are modulated into the light according to a self-clocking coding scheme;
   a filter arranged to match a template waveform of said coding scheme against the received signal, thereby generating a pattern of filtered waveforms each corresponding to a respective portion of said data; and
   a timing and data recovery module for recovering the timing from said signal based on characteristic points of said filtered waveforms, wherein the timing and data recovery module is configured to separate the filtered waveforms into at least two different sub-patterns in dependence on the data before recovering the timing, and to recover the timing by processing each of the sub-patterns individually based on the characteristic points of each sub-pattern,
   wherein each of the sub-patterns represents the waveforms of that sub-pattern as being aligned in time according to a period of the data, and wherein the timing and data recovery module is configured to perform the recovery of said timing based on a relative timing of the characteristic points as represented within each sub-pattern.

2. The receiver of claim 1, wherein the timing and data recovery module is configured to separate each of the filtered waveforms into one of the at least two different sub-patterns in dependence on the respective portion of data.

3. The receiver of claim 1, wherein each of said portions comprises at least two bits of the data.

4. The receiver of claim 2, wherein each of the portions comprises a respective sequence of at least two consecutive bits of said data, and the timing and data recovery module is configured to separate each of the filtered waveforms into one of the different at least two sub-patterns in dependence on relative values of the bits of the respective sequence.

5. The receiver of claim 4, wherein each of the portions comprises a respective pair of consecutive bits, and the timing and data recovery module is configured to separate each of the filtered waveforms into a first sub-pattern if the respective pair of consecutive bits are the same, and into a second sub-pattern if the respective pair of consecutive bits are different.

6. The receiver of claim 1, wherein said period is a bit period of the data.

7. The receiver of claim 1, wherein the characteristic points are zero crossings.

8. The receiver of claim 7, wherein the timing and data recovery module is configured to recover the timing based on the zero-crossing occurring between detection data points of the filtered waveforms.

9. The receiver of claim 8, wherein the data detection points are at peaks of the filtered waveforms.

10. A coded light receiver, comprising:
a sensor for receiving coded light, the coded light comprising a signal whereby data and timing are modulated into the light according to a self-clocking coding scheme;
a filter arranged to match a template waveform of said coding scheme against the received signal, thereby generating a pattern of filtered waveforms each corresponding to a respective portion of said data; and
a timing and data recovery module for recovering the timing from said signal based on characteristic points of said filtered waveforms, wherein the timing and data recovery module is configured to separate the filtered waveforms into different sub-patterns in dependence on the data, and to recover the timing by processing each of the sub-patterns individually based on the characteristic points of each sub-pattern,
wherein the timing and data recovery module is configured to perform the recovery of said timing by:
performing a preliminary synchronization from a known preamble of said signal,
detecting data from a first part of the signal using the preliminary synchronization,
performing a first determination of the timing based on the characteristic points of the filtered waveforms separated into the sub-patterns in dependence on the data from the first part of the signal,
detecting the data from a second part of the signal using the first determination of the timing, and performing a second determination of the timing based on the characteristic points of the filtered waveforms separated into the sub-patterns in dependence on the data from the second part of the signal.

11. The receiver of claim 10, comprising a low pass filter arranged to filter said signal, wherein the filtered waveforms are dependent on the data, the matched filter and the low pass filter.

12. The receiver of claim 11, wherein the timing and data recovery module is configured to determine a position of each of the characteristic points within each of the sub-patterns and a respective error associated with each of the characteristic points, and to recover the timing based on a function comprising a contribution from each of the positions with each contribution being weighted according to the respective error.

13. The receiver of claim 12, wherein the timing and data recovery module is configured to allocate a higher error given to a characteristic point from filtered waveforms having a shape with shallower slope at the characteristic point, and to allocate a lesser error to a characteristic point from filtered waveforms having a shape with steeper slope at the characteristic point.

14. A computer program product for operating a coded light receiver, the computer program product comprising code embodied on a non-transitory computer-readable storage medium and configured so as when executed to perform operations of:
receiving coded light via a sensor of the coded light receiver, the coded light comprising a signal whereby data and timing are modulated into the light according to a self-clocking coding scheme;
matching a template waveform of said coding scheme against the received signal, thereby generating a pattern of filtered waveforms each corresponding to a respective portion of said data;
separating the filtered waveforms into at least two different sub-patterns in dependence on the data before recovering the timing; and
recovering the timing by processing each of the sub-patterns individually based on the characteristic points of each sub-pattern,
wherein each of the sub-patterns represents the waveforms of that sub-pattern as being aligned in time according to a period of the data, and wherein the recovering of the timing is based on a relative timing of the characteristic points as represented within each sub-pattern.

15. A coded light receiver, comprising:
a sensor for receiving coded light, the coded light comprising a signal whereby data and timing are modulated into the light according to a self-clocking coding scheme;
a filter arranged to match a template waveform of said coding scheme against the received signal, thereby generating a pattern of filtered waveforms each corresponding to a respective portion of said data; and
a timing and data recovery module for recovering the timing from said signal based on characteristic points of said filtered waveforms, wherein the timing and data recovery module is configured to separate the filtered waveforms into at least two different sub-patterns in dependence on the data before recovering the timing, the at least two different sub-patterns comprising eye patterns, and to recover the timing by processing each of the sub-patterns individually based on the characteristic points of each sub-pattern.

* * * * *